United States Patent
Sakurai

(10) Patent No.: US 8,284,099 B2
(45) Date of Patent: Oct. 9, 2012

(54) FMCW SIGNAL GENERATION CIRCUIT AND RADAR APPARATUS

(75) Inventor: Hiroki Sakurai, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 215 days.

(21) Appl. No.: 12/880,278

(22) Filed: Sep. 13, 2010

(65) Prior Publication Data

US 2011/0227785 A1   Sep. 22, 2011

(30) Foreign Application Priority Data

Mar. 19, 2010 (JP) .................................. 2010-065223

(51) Int. Cl.
*G01S 13/16* (2006.01)
(52) U.S. Cl. ......... 342/200; 342/100; 342/128; 342/175
(58) Field of Classification Search .................. 342/200, 342/128–135, 175, 195, 100
See application file for complete search history.

(56) References Cited

U.S. PATENT DOCUMENTS

| | | | | |
|---|---|---|---|---|
| 4,509,049 A * | 4/1985 | Haendel et al. | ................ | 342/87 |
| 4,599,618 A * | 7/1986 | Haendel et al. | ................ | 342/87 |
| 5,189,427 A * | 2/1993 | Stove et al. | .................... | 342/128 |
| 6,147,638 A * | 11/2000 | Rohling et al. | ............... | 342/109 |
| 6,255,984 B1 * | 7/2001 | Kreppold et al. | ............. | 342/128 |
| 7,692,574 B2 * | 4/2010 | Nakagawa | ................ | 342/107 |
| 7,737,882 B2 * | 6/2010 | Matsuoka | ..................... | 342/109 |
| 2007/0085579 A1 | 4/2007 | Wallbert et al. | ............... | 327/156 |
| 2008/0258962 A1 * | 10/2008 | Kai | ............... | 342/104 |
| 2009/0033538 A1 * | 2/2009 | Winkler | ........................ | 342/21 |
| 2010/0073222 A1 | 3/2010 | Mitomo et al. | ............... | 342/175 |
| 2010/0245160 A1 * | 9/2010 | Sakurai et al. | ................ | 342/200 |
| 2011/0156947 A1 * | 6/2011 | Kanamoto | .................... | 342/107 |
| 2011/0227785 A1 * | 9/2011 | Sakurai | ......................... | 342/200 |
| 2012/0112806 A1 * | 5/2012 | Dayi | ............................. | 327/145 |

FOREIGN PATENT DOCUMENTS

| | | |
|---|---|---|
| JP | 2002-062355 A | 2/2002 |
| JP | 2008-072257 A | 3/2008 |
| JP | 2008-224350 A | 9/2008 |

(Continued)

OTHER PUBLICATIONS

Watanabe, T.; Yamauchi, S.; , "An all-digital PLL for frequency multiplication by 4 to 1022 with seven-cycle lock time," Solid-State Circuits, IEEE Journal of , vol. 38, No. 2, pp. 198-204, Feb. 2003.*

(Continued)

*Primary Examiner* — John B Sotomayor
(74) *Attorney, Agent, or Firm* — Ohlandt, Greeley, Ruggiero & Perle, L.L.P.

(57) ABSTRACT

According to one embodiment, an FMCW signal generation circuit includes a voltage-controlled oscillator, a digital phase detector, a differentiator, a comparator, a low-pass filter, an amplifier, a D/A converter, and an integrator. The voltage-controlled oscillator generates an FMCW signal including an oscillation frequency corresponding to a control signal. The digital phase detector detects phase information of the FMCW signal to generate a detection signal. The differentiator differentiates the detection signal once to generate a differential signal. The comparator compares the differential signal with a target frequency to generate an error signal. The low-pass filter suppresses a high-frequency component of the error signal to generate a filtered signal. The amplifier amplifies the filtered signal to generate an amplified signal. The D/A converter converts the amplified signal to analog to generate an analog signal. The integrator integrates the analog signal to generate the control signal.

5 Claims, 3 Drawing Sheets

FOREIGN PATENT DOCUMENTS

| | | | |
|---|---|---|---|
| JP | 2010-237172 | A | 10/2010 |
| JP | 2010237172 | A * | 10/2010 |
| JP | 2011196880 | A * | 10/2011 |
| WO | 2009-028010 | A1 | 3/2009 |

OTHER PUBLICATIONS

Japanese search report dated Jan. 31, 2012 (with English translation) from corresponding JP 2010-065223.

* cited by examiner

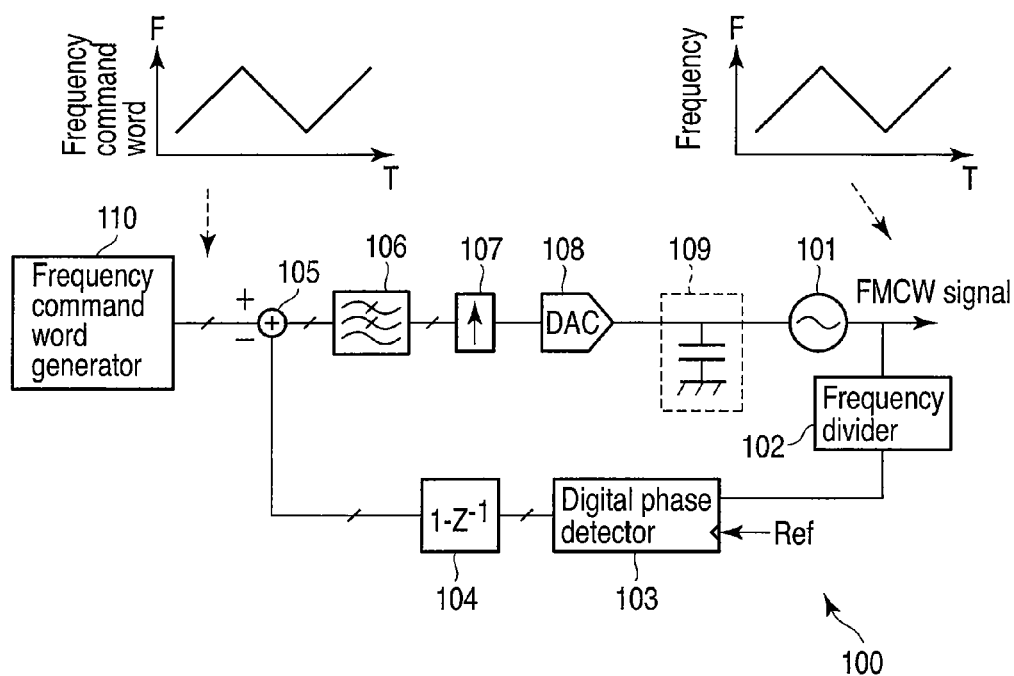
F I G. 1

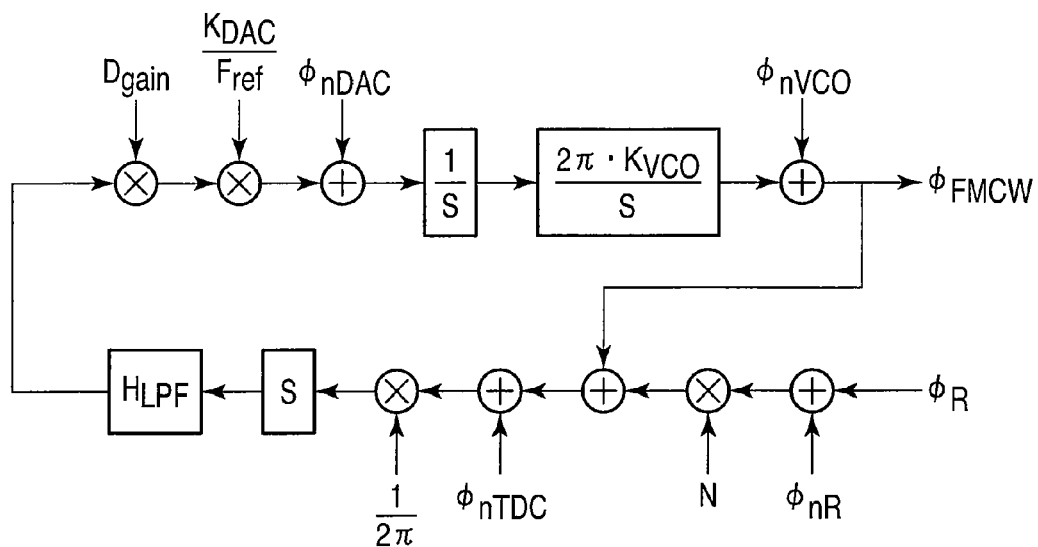
F I G. 2
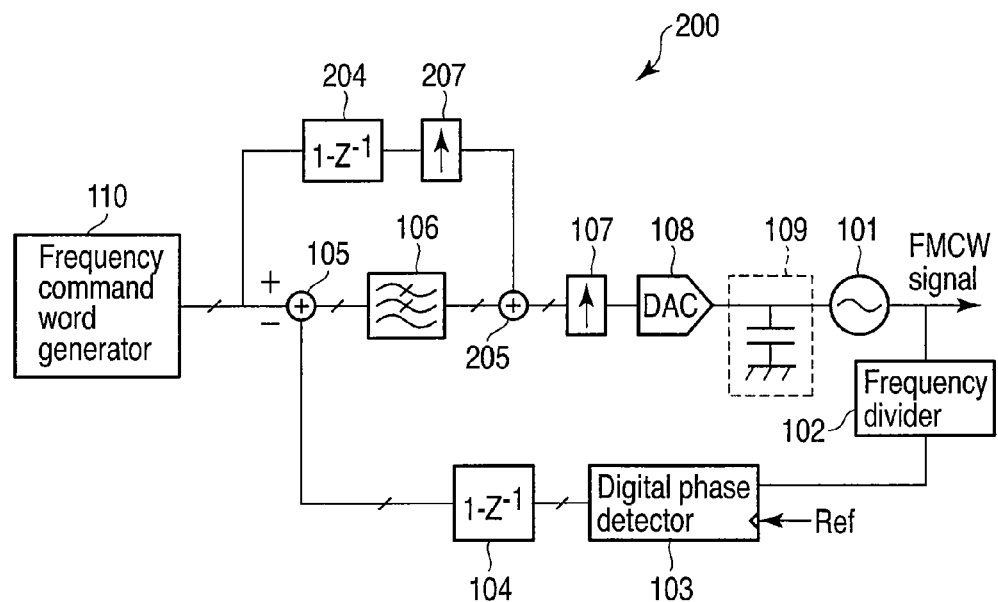
F I G. 3

//>

FMCW SIGNAL GENERATION CIRCUIT AND RADAR APPARATUS

CROSS-REFERENCE TO RELATED APPLICATIONS

This application is based upon and claims the benefit of priority from Japanese Patent Application No. 2010-065223, filed Mar. 19, 2010; the entire contents of which are incorporated herein by reference.

FIELD

Embodiments described herein relate generally to an FMCW signal generation circuit and a radar apparatus.

BACKGROUND

Radar apparatuses using radio signals include a radar apparatus using FMCW (Frequency Modulated Continuous Wave) signals. The radar apparatus transmits an FMCW signal, and receives, as the received signal, the FMCW signal returned as it is reflected by an object. The radar apparatus multiplies the received signal by the transmission signal to generate a multiplied signal. The frequency of the multiplied signal is determined by the time difference between the received signal and the transmission signal. Hence, the radar apparatus measures the distance to the object, its relative speed, or the like by generating the multiplied signal. For accurate measurement, the FMCW signal needs to change its frequency almost linearly with respect to the time.

There is conventionally proposed a method of converting the frequency of the output signal from a voltage-controlled oscillator into a voltage, comparing it with an externally input voltage signal with a triangular waveform, and controlling the voltage-controlled oscillator using the error between them, thereby generating an FMCW signal having high linearity (for example, JP-A 2008-224350 (KOKAI)).

When a voltage-controlled oscillator, frequency-voltage converter, operational amplifier, and the like are used for FMCW signal generation, as in the above-described method, these circuits generate noise, and this leads to phase noise in FMCW signals. The phase noise degrades the characteristics of the FMCW signals.

BRIEF DESCRIPTION OF THE DRAWINGS

FIG. 1 is a block diagram showing an FMCW signal generation circuit 100 according to the first embodiment;

FIG. 2 is a block diagram showing the transfer function of the FMCW signal generation circuit 100 according to the first embodiment;

FIG. 3 is a block diagram showing an FMCW signal generation circuit 200 according to the second embodiment;

DETAILED DESCRIPTION

Figure 4:
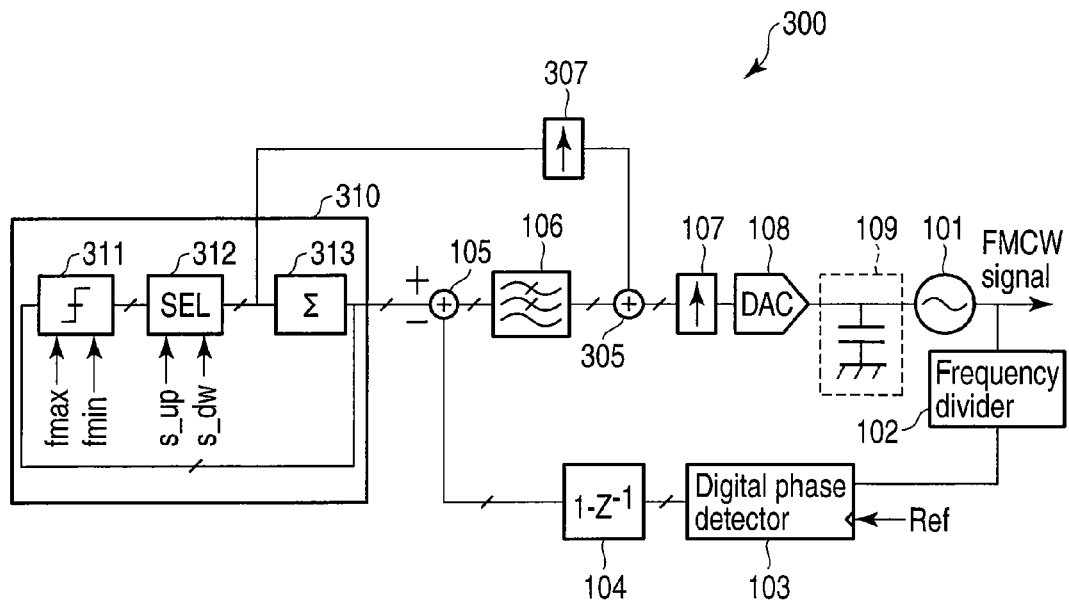
FIG. 4 is a block diagram showing an FMCW signal generation circuit 300 according to the third embodiment.

In general, according to one embodiment, an FMCW signal generation circuit includes a voltage-controlled oscillator unit, a digital phase detector unit, a differentiator unit, a comparator unit, a low-pass filter unit, an amplifier unit, a D/A converter unit, and an integrator unit. The voltage-controlled oscillator unit generates an FMCW signal including an oscillation frequency corresponding to a control signal. The digital phase detector unit detects phase information of the FMCW signal to generate a detection signal. The differentiator unit differentiates the detection signal once to generate a differential signal including information of the oscillation frequency. The comparator unit compares the differential signal with a target frequency to generate an error signal. The low-pass filter unit suppresses a high-frequency component of the error signal to generate a filtered signal. The amplifier unit amplifies the filtered signal to generate an amplified signal. The D/A converter unit converts the amplified signal to analog to generate an analog signal. The integrator unit integrates the analog signal to generate the control signal.

First Embodiment

An FMCW signal generation circuit 100 according to the first embodiment will be described with reference to FIG. 1. The FMCW signal generation circuit 100 shown in FIG. 1 comprises a voltage-controlled oscillator 101 which generates an FMCW signal including an oscillation frequency corresponding to a control signal, a digital phase detector 103 which detects the phase information of the FMCW signal obtained via a frequency divider 102, and generates a detection signal, a differentiator 104 which differentiates the detection signal once to generate a differential signal including the information of the oscillation frequency of the FMCW signal, a comparator 105 which compares the differential signal with a target frequency to generate an error signal, a low-pass filter 106 which suppresses the high-frequency component of the error signal to generate a filtered signal, an amplifier 107 which amplifies the filtered signal to generate an amplified signal, a D/A converter 108 which converts the amplified signal from digital to analog to generate an analog signal, and an integrator 109 which integrates the analog signal to generate a control signal to be used to control the voltage-controlled oscillator 101.

The FMCW signal generation circuit 100 includes the frequency divider 102 which divides the frequency of the FMCW signal to generate a frequency-divided signal, and transfers it to the digital phase detector. The FMCW signal generation circuit 100 also includes a frequency command word (FCW) generator 110 which generates an FCW serving as a target frequency. Note that in this embodiment, the FCW generator 110 is provided in the FMCW signal generation circuit 100. However, the FCW generator 110 may be separated from the FMCW signal generation circuit 100.

Details of each unit will be explained next.

The voltage-controlled oscillator 101 changes its oscillation frequency in accordance with the analog control signal. The FMCW signal changes its frequency almost linearly with respect to the time. The voltage-controlled oscillator 101 generates an FMCW signal whose frequency changes, for example, triangularly, as shown in FIG. 1.

The frequency divider 102 divides the frequency of the FMCW signal to generate a frequency-divided signal. The FMCW signal has a very high frequency component. On the other hand, the digital phase detector 103 at the succeeding stage can detect only the phase of a signal of several GHz. To cope with this, in this embodiment, the frequency divider 102 lowers the frequency by dividing the frequency of the FMCW signal. For example, if the FMCW signal generation circuit 100 generates an FMCW signal in the 77-GHz band, the frequency divider 102 divides its frequency into 32 so as to generate a frequency-divided signal whose frequency is as low as about 2.4 GHz as compared to the 77-GHz FMCW signal.

The digital phase detector 103 receives the frequency-divided signal and a reference signal Ref. The reference signal Ref has a predetermined period, and is, for example, a clock signal. The digital phase detector 103 detects the phase information of the frequency-divided signal at the period of the reference signal Ref, thereby generating a detection signal of digital code. The digital phase detector 103 may be implemented by, for example, a counter circuit that counts the number of pulses of the frequency-divided signal and outputs the count. Alternatively, the digital phase detector 103 may be implemented by a TDC (Time-to-Digital Converter) which detects the time difference between the leading edge of the frequency-divided signal and that of the reference signal, thereby generating a detection signal of digital code representing the time difference. Otherwise, the digital phase detector 103 may be implemented by combining the counter circuit and the TDC.

The differentiator 104 differentiates the detection signal obtained from the digital phase detector 103 to generate a differential signal. When the detection signal representing the phase information of the FMCW signal is differentiated, the frequency information of the FMCW signal is obtained. Hence, the differential signal generated by the differentiator 104 includes the frequency information.

The FCW generator 110 generates an FCW representing the frequency to be realized by the FMCW signal. The FCW has, for example, a triangular waveform, saw-tooth waveform, or trapezoidal waveform. In the example shown in FIG. 1, since a signal having a triangular waveform is output as the FMCW signal, a signal that changes its frequency triangularly with respect to the time is generated as the FCW. The FCW generator 110 generates the FCW of digital code.

The comparator 105 compares the differential signal with the FCW to generate an error signal. For example, the comparator 105 has a subtractor, and calculates the difference between the differential signal and the FCW as the error signal. The differential signal includes the frequency information of the FMCW signal. The FCW includes the target frequency information of the FMCW signal. Hence, the comparator 105 calculates the difference between the differential signal and the FCW code, thereby detecting the difference between the frequency of the FMCW signal and its target frequency. The comparator 105 transfers the detected difference to the low-pass filter 106 as the error signal.

The low-pass filter 106 suppresses the high-frequency component of the error signal. The low-pass filter 106 transfers the error signal with the high-frequency component suppressed to the amplifier 107 as a filtered signal.

The amplifier 107 amplifies the filtered signal by n (n is a positive real number). Note that the amplifier 107 also amplifies a signal by less than 1. That is, the amplifier 107 amplifies the filtered signal by 1/A (A is a positive real number). This means that the amplifier 107 attenuates the filtered signal to 1/A. The amplifier 107 transfers the signal obtained by amplifying the filtered signal to the D/A converter 108 as an amplified signal.

The D/A converter 108 converts the amplified signal of digital code into an analog signal. The D/A converter 108 transfers the analog amplified signal obtained upon conversion to the integrator 109 as an analog signal. The integrator 109 integrates the analog signal to generate a control signal. If the error signal has information representing a predetermined positive value, the integrator 109 generates a control signal which increases at a predetermined ratio with respect to the time. If the error signal has information representing a predetermined negative value, the integrator 109 generates a control signal which decreases at a predetermined ratio. The integrator 109 controls the voltage-controlled oscillator 101 using the control signal.

The operation of the FMCW signal generation circuit 100 will be described next.

The FMCW signal generated by the voltage-controlled oscillator 101 is output to the outside and also input to the frequency divider 102. The frequency divider 102 divides the frequency of the FMCW signal so as to convert it to a frequency-divided signal having a lower frequency. The frequency-divided signal is transferred to the digital phase detector 103. The digital phase detector 103 detects the phase information of the frequency-divided signal based on the reference signal Ref. The detected phase information is transferred to the differentiator 104 as a detection signal.

The differentiator 104 differentiates the detection signal. When the phase information is differentiated, frequency information is obtained. The differentiator 104 differentiates the detection signal including the phase information so as to obtain a differential signal including frequency information. The differential signal is transferred to the comparator 105. The comparator 105 generates an error signal based on the differential signal and the FCW. The error signal includes error information between the frequency of the FMCW signal and the target frequency. The error signal is transferred to the low-pass filter 106.

The low-pass filter 106 suppresses the high-frequency component of the error signal so as to convert it into a filtered signal. The amplifier 107 amplifies the filtered signal so as to convert it into an amplified signal. The D/A converter 108 converts the digital amplified signal into an analog signal. The analog signal generated by the D/A converter 108 is transferred to the integrator 109. The integrator 109 integrates the analog signal so as to convert it into a control signal. The control signal controls the voltage-controlled oscillator 101.

The transfer function of the FMCW signal generation circuit 100 in FIG. 1 will be obtained next using FIG. 2. In FIG. 2, $\phi_{FMCW}$ is the phase of the FMCW signal, $\phi_R$ is the phase of the reference signal Ref, $\phi_{nR}$ is the phase noise of the reference signal, N is the number of divided frequencies, $\phi_{nTDC}$ is quantization noise generated in the digital phase detector 103, $H_{LPF}$ is the transfer function of the low-pass filter 106, $D_{gain}$ is the gain of the amplifier 107, $K_{DAC}$ is the gain of the D/A converter 108, $f_{ref}$ is the frequency of the reference signal, $\phi_{nDAC}$ is noise generated in the D/A converter 108, $K_{VCO}$ is the gain of the voltage-controlled oscillator 101, and $\phi_{nVCO}$ is phase noise generated in the voltage-controlled oscillator 101.

A open-loop transfer function $H_{op}$ of the FMCW signal generation circuit 100 is given by $$H_{op} = \frac{H_{LPF} \cdot D_{gain} \cdot K_{DAC} \cdot K_{VCO}}{s} \quad (1)$$

A noise transfer function $NTF_R$ from $\phi_{nR}$ to the output, a noise transfer function $NTF_{TDC}$ from $\phi_{nTDC}$ to the output, a noise transfer function $NTF_{TDC}$ from $\phi_{nTDC}$ to the output, and a noise transfer function $NTF_{VCO}$ from $\phi_{nVCO}$ to the output are given by $$NTF_R = N \cdot \frac{H_{op}}{1 + H_{op}} \quad (2)$$

-continued $$NTF_{TDC} = \frac{H_{op}}{1 + H_{op}} \quad (3)$$

$$NTF_{DAC} = \frac{2\pi K_{VCO}/s^2}{1 + H_{op}} \quad (4)$$

$$NTF_{VCO} = \frac{1}{1 + H_{op}} \quad (5)$$

As indicated by the above equations, $NTF_R$, $NTF_{TDC}$, and $NTF_{DAC}$ exhibit a low-pass filter characteristic, and $NTF_{VCO}$ exhibits a high-pass filter characteristic. Hence, the high frequency component of the noise including in the reference signal and the digital phase detector 103 and the D/A converter 108 is suppressed. Similarly the low-frequency component of the noise including in the voltage-controlled oscillator 101 is suppressed.

As described above, according to the FMCW signal generation circuit 100 of this embodiment, it is possible to suppress phase noise generated in each block. Additionally, the integrator 109 integrates not a digital signal but an analog signal. This allows to implement the FMCW signal generation circuit 100 capable of suppressing phase noise.

Assume that the integrator 109 is implemented by a digital circuit. In this case, the voltage-controlled oscillator 101 is controlled by causing a D/A converter that outputs a voltage to convert the control signal of digital code integrated by the integrator 109 into an analog control voltage. Alternatively, a DCO (Digitally Controlled Oscillator) is used in place of the voltage-controlled oscillator 101, and directly controlled using the integrated control signal of digital code.

However, the control signal of the voltage-controlled oscillator 101 needs to change almost linearly with respect to the time. When the integrator 109 is implemented by a digital circuit, the frequency of the oscillator is switched for every clock signal. This increases the frequency error, and degrades the linearity of the frequency. To implement an FMCW signal generation circuit that suppresses the frequency error so as to satisfy specifications needed in a radar apparatus, the above-described D/A converter and DCO need to have a high operation speed and accuracy. On the other hand, when the integrator 109 is implemented by an analog circuit, the D/A converter 108 that outputs a current need only output a current almost constant with respect to the time. Hence, it can be implemented at a low operation speed. That is, the integrator 109 formed from an analog circuit can reduce the circuit scale and power consumption of the FMCW signal generation circuit 100.

As indicated by the above equations, $NTF_R$, $NTF_{TDC}$, and $NTF_{DAC}$ exhibit a low-pass filter characteristic, and $NTF_{VCO}$ exhibits a high-pass filter characteristic. Hence, the high frequency component of the noise including in the reference signal and the digital phase detector 103 and the D/A converter 108 is suppressed. Similarly the low-frequency component of the noise including in the voltage-controlled oscillator 101 is suppressed.

Second Embodiment

An FMCW signal generation circuit 200 according to the second embodiment will be described next with reference to FIG. 3. In addition to the arrangement of the FMCW signal generation circuit 100 shown in FIG. 1, the FMCW signal generation circuit 200 further comprises a second differentiator 204 which differentiates an FCW serving as a target frequency to generate a second differential signal, a second amplifier 207 which amplifies the second differential signal to generate a second amplified signal, and an adder 205 which adds the second amplified signal to a filtered signal to generate an added signal. This allows to modulate the FMCW signal to be output in a wide band.

Upon obtaining an FCW, the second differentiator 204 differentiates it to generate a second differential signal. To adjust the gain of the second differential signal, the second amplifier 207 amplifies the second differential signal by n (n is a positive real number). Note that the second amplifier 207 also amplifies a signal by less than 1. That is, the second amplifier 207 amplifies the second differential signal by 1/A (A is a positive real number). This means that the second amplifier 207 attenuates the second differential signal to 1/A. The second amplifier 207 transfers the signal obtained by amplifying the second differential signal to the adder 205 as a second amplified signal.

The adder 205 is provided between a low-pass filter 106 and an amplifier 107. The adder 205 adds a filtered signal obtained from the low-pass filter 106 to the second amplified signal obtained from the second amplifier 207, thereby generating an added signal. The adder 205 transfers the added signal to the amplifier 107. The amplifier 107 amplifies the added signal, and transfers it to a D/A converter 108 as an amplified signal.

The operation principles of the second differentiator 204 and the second amplifier 207 will be described next. First, a transfer function $H_{mod2}$ from the input of the second differentiator 204 to the frequency of the FMCW signal is obtained. Letting $D_{gain2}$ be the gain of the second amplifier 207, the transfer function $H_{mod2}$ from the input of the second differentiator 204 to the frequency of the FMCW signal is given by $$H_{mod2} = \frac{2\pi D_{gain} D_{gain2} K_{DAC} K_{VCO}/f_{ref}}{1 + H_{op}} \quad (6)$$

$H_{mod2}$ exhibits a high-pass characteristic. Hence, the second differentiator 204 and the second amplifier 207 operate as a high-pass filter.

As described in the first embodiment, passing the error signal through the low-pass filter 106 enables to suppress the high-frequency component of phase noise contained in the frequency error. However, the high-frequency component of the FCW is also suppressed simultaneously. Hence, the negative feedback loop cannot follow up the change of the FCW at a portion with a steep change, like an apex of a triangular wave or saw-tooth wave.

Consequently, damping occurs in the frequency of the FMCW signal output from a voltage-controlled oscillator 101. Since the frequency error becomes large during this time, the radar apparatus cannot measure the distance or speed accurately.

In the FMCW signal generation circuit 200, a path (the path of the second differentiator 204 and the second amplifier 207) that outputs the FCW without passing it through the low-pass filter 106 is provided to compensate for the high-frequency component of the FCW. Note that the second amplifier 207 is inserted for gain matching between the path (filtered signal) that passes through the low-pass filter 106 and the path (second differential signal) that does not pass.

As described above, according to the FMCW signal generation circuit 200 of this embodiment, the same effect as in the first embodiment can be obtained. In addition, it is possible to compensate for the high-frequency component of the FCW by adding the second amplified signal that has not passed through the low-pass filter 106 to the filtered signal that has passed through the low-pass filter 106. Hence, even when the FCW has a signal waveform such as a triangular waveform or saw-tooth waveform with steep change, the frequency error of the FMCW signal can be decreased. This allows to widen the frequency modulation range of the FMCW signal.

Note that an adder may be provided at the output of the first amplifier to add the output from the second amplifier.

Third Embodiment

An FMCW signal generation circuit 300 according to the third embodiment will be described next with reference to FIG. 4. The FMCW signal generation circuit 300 shown in FIG. 4 comprises an FCW generator 310 in place of the FCW generator 110 in FIG. 1. The FMCW signal generation circuit 300 also comprises a third amplifier 307 and a second adder 305 in addition to the arrangement of the FMCW signal generation circuit 100 in FIG. 1.

The FCW generator 310 includes a second comparator 311 which compares an FCW serving as a target frequency with a maximum frequency fmax or minimum frequency fmin to generate a comparison signal, a generator 312 which generates a setting signal to set the variation of the frequency of the FMCW signal in accordance with the comparison signal, and a second integrator 313 which integrates a first signal or second signal to generate an FCW.

The second comparator 311 compares the FCW with the maximum frequency fmax or minimum frequency fmin. The maximum frequency fmax is information to be used to determine the maximum frequency of the FMCW signal. The minimum frequency fmin is information to be used to determine the minimum frequency of the FMCW signal. The second comparator 311 determines whether the FCW to be output from the FCW generator 310 is more than the maximum frequency fmax, falls within the range from the maximum frequency fmax (inclusive) to the minimum frequency fmin (exclusive), or is less than the minimum frequency fmin so as to generate a comparison signal.

The generator 312 generates a setting signal based on the comparison signal. For example, in this embodiment, assume that the FCW is a signal with a triangular waveform. In this case, the generator 312 can be implemented as a selector that generates the setting signal by selecting a first signal representing a positive slope of the triangular wave and a second signal representing a negative slope, as shown in FIG. 4. Hence, the setting signal alternately includes the first signal and the second signal.

Upon receiving a comparison signal representing that the FCW is more than the maximum frequency fmax when the first signal is being selected, the generator 312 switches the selected signal from the first signal to the second signal. Upon receiving a comparison signal representing that the FCW is equal to or less than the minimum frequency fmin when the second signal is being selected, the generator 312 switches the selected signal from the second signal to the first signal. Upon receiving a comparison signal representing that the FCW falls within the range from the maximum frequency fmax (inclusive) to the minimum frequency fmin (exclusive), the generator 312 continues selecting the first or second signal that is being selected then.

An FCW having a triangular waveform is obtained by making the magnitude of the positive slope equal that of the negative slope. An FCW having a saw-tooth waveform is obtained by increasing the magnitude of one of the slopes. An FCW having a trapezoidal waveform is obtained by inserting a time the frequency variation becomes zero to the slope switching timing.

The generator 312 thus generates a setting signal alternately including the first signal and the second signal. The generator 312 transfers the setting signal to the second integrator 313 and the third amplifier 307.

The second integrator 313 integrates the setting signal to generate an FCW. The integrator 313 transfers the FCW to a comparator 105 and the second comparator 311.

The third amplifier 307 amplifies the setting signal by n (n is a positive real number). Note that the third amplifier 307 also amplifies a signal by less than 1. That is, the third amplifier 307 amplifies the setting signal by 1/A (A is a positive real number). This means that the third amplifier 307 attenuates the setting signal to 1/A. The third amplifier 307 transfers the signal obtained by amplifying the setting signal to the second adder 305 as a third amplified signal.

The second adder 305 is provided between a low-pass filter 106 and an amplifier 107. The second adder 305 adds a filtered signal obtained from the low-pass filter 106 to the third amplified signal obtained from the third amplifier 307, thereby generating a second added signal. The second adder 305 transfers the second added signal to the amplifier 107. The amplifier 107 amplifies the second added signal, and transfers it to a D/A converter 108 as an amplified signal.

As described above, according to the FMCW signal generation circuit 300 of this embodiment, the same effect as in the second embodiment can be obtained by amplifying the setting signal and adding it to the filtered signal. This is because when the setting signal is integrated, an FCW is obtained. Hence, the same signal as the second differential signal can be obtained from the FCW generator 310 without providing the second differentiator 204, as in the FMCW signal generation circuit 200 shown in FIG. 3. This allows to reduce the circuit scale of the FMCW signal generation circuit 300

Fourth Embodiment

Figure 5:
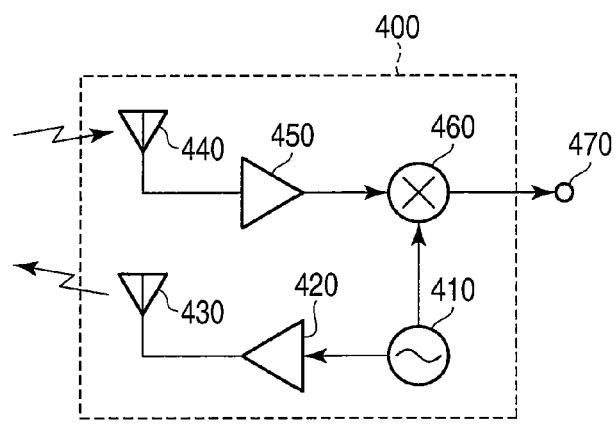
FIG. 5 is a block diagram showing a radar apparatus 400 according to the fourth embodiment.

The fourth embodiment will be described next with reference to FIG. 5. FIG. 5 illustrates an FMCW radar apparatus 400 including an FMCW signal generation circuit 410 described in one of the first to third embodiments.

A power amplifier 420 amplifies an FMCW signal output from the FMCW signal generation circuit 410 to a required power to generate a transmission signal. The transmission signal is transmitted from a transmitting antenna 430 to space. The transmitted signal is reflected by an object (not shown). The reflected signal is received by a receiving antenna 440. The received signal obtained from the receiving antenna 440 is amplified by a preamplifier 450 such as low-noise amplifier and thus converted into an amplified signal.

A mixer circuit 460 multiplies the amplified signal output from the preamplifier 450 by the FMCW signal output from the FMCW signal generation circuit 410. The mixer circuit 460 thus generates a signal having a frequency depending on the distance from the FMCW radar apparatus 400 to the object. The sine wave signal is output from a radar output terminal 470 to an upper application (not shown).

Note that the transmitting antenna 430 and the receiving antenna 440 will be referred to as an antenna unit as a whole.

As described above, according to the radar apparatus of the fourth embodiment, it is possible to implement an accurate radar apparatus using the FMCW signal generation circuit capable of suppressing phase noise, as described in the first to third embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An FMCW signal generation circuit comprising:
a voltage-controlled oscillator unit configured to generate an FMCW signal including an oscillation frequency corresponding to a control signal;
a digital phase detector unit configured to detect phase information of the FMCW signal to generate a detection signal;
a differentiator unit configured to differentiate the detection signal once to generate a differential signal including information of the oscillation frequency;
a comparator unit configured to compare the differential signal with a target frequency to generate an error signal;
a low-pass filter unit configured to suppress a high-frequency component of the error signal to generate a filtered signal;
an amplifier unit configured to amplify the filtered signal to generate an amplified signal;
a D/A converter unit configured to convert the amplified signal to analog to generate an analog signal; and
an integrator unit configured to integrate the analog signal to generate the control signal.

2. The circuit according to claim 1, further comprising:
a second differentiator unit configured to differentiate the target frequency to generate a second differential signal;
a second amplifier unit configured to amplify the second differential signal to generate a second amplified signal; and
an adder unit configured to add the second amplified signal to the filtered signal to generate an added signal,
wherein the amplifier unit amplifies the added signal to generate the amplified signal.

3. The circuit according to claim 1, further comprising:
a second comparator unit configured to compare the target frequency with one of a maximum frequency and a minimum frequency to generate a comparison signal;
a generator unit configured to generate a setting signal to set a variation of the oscillation frequency in accordance with the comparison signal;
a second integrator unit configured to integrate the setting signal to generate the target frequency;
a third amplifier unit configured to amplify the setting signal to generate a third amplified signal; and
a second adder unit configured to add the third amplified signal to the filtered signal to generate a second added signal,
wherein the amplifier amplifies the added signal to generate the amplified signal.

4. The circuit according to claim 1, further comprising a frequency divider unit configured to divide the frequency of the FMCW signal.

5. A radar apparatus comprising:
an FMCW signal generation circuit of claim 1;
a power amplifier unit configured to amplify the FMCW signal to a required power to generate a transmission signal;
an antenna unit configured to transmit the transmission signal to space, and receives the signal reflected by an object to obtain a received signal;
a preamplifier unit configured to amplify the received signal to obtain a preamplified signal; and
a mixer circuit unit configured to multiply the preamplified signal by the FMCW signal to obtain an output signal.

* * * * *